US007349920B1

(12) United States Patent
Feinberg et al.

(10) Patent No.: US 7,349,920 B1
(45) Date of Patent: Mar. 25, 2008

(54) SIMULTANEOUS DISPLAY OF MULTIPLE CALENDAR SYSTEMS

(75) Inventors: Yaniv Feinberg, Redmond, WA (US); Antonio Alwan, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 10/778,273

(22) Filed: Feb. 13, 2004

(51) Int. Cl.
*G06F 17/30* (2006.01)

(52) U.S. Cl. ...................................... 707/102
(58) Field of Classification Search ............... 707/1, 707/2, 9, 10, 102, 104.1; 709/224; 715/703
See application file for complete search history.

(56) References Cited

U.S. PATENT DOCUMENTS

| | | | | |
|---|---|---|---|---|
| 5,528,558 | A * | 6/1996 | Mardhekar et al. | 368/10 |
| 6,108,640 | A | 8/2000 | Slotznick | |
| 6,111,572 | A * | 8/2000 | Blair et al. | 715/703 |
| 2003/0171965 | A1* | 9/2003 | Ratzlaff et al. | 705/8 |
| 2003/0230890 | A1* | 12/2003 | Perelman | 283/2 |

OTHER PUBLICATIONS

Bulletin of the American Meteorological Society, v. 81, No. 1, p. 69-74, Calendars and Software, by Jon E. Ahlquist.
Production Planning and Control, v. 10, No. 8, p. 815-817, International Standard for Denotation of Calendar Time, by Kent Lund.
IEEE Transactions on Consumer Electronics, v. 39, p. 847-52.
Software: Practice & Experience, v. 23, p. 383-404, Calendrical Calculations, II: Three Historical Calendars, by Edward M. Reingold, Nachum Dershowitz and Stewart M. Clamen.
Software: Practice and Experience, v. 20, p. 899-928, Calendrical Calculations, by Nachum Dershowitz and Edward M. Reingold.
Michael D. Yaary, Office Action Summary, Mar. 9, 2007, U.S. Appl. No. 10/778,847.

* cited by examiner

*Primary Examiner*—Etienne Leroux
(74) *Attorney, Agent, or Firm*—Merchant & Gould, PC; Gregory G. Johnson

(57) ABSTRACT

A calendar display, method and system are disclosed that can provide a calendar display showing a period of one or more days and simultaneously showing information for the days in the display period in more than one calendar system. The calendar system displays calendar data in calendar display based on a primary calendar system. The calendar system also calculates and displays information in a second calendar system so the user is simultaneously provided with information the primary and secondary calendar systems.

33 Claims, 9 Drawing Sheets

SIMULTANEOUS DISPLAY OF MULTIPLE CALENDAR SYSTEMS

RELATED APPLICATIONS

This application is related to U.S. application Ser. No. 10/778,847, filed Feb. 13, 2004, titled "Supporting Multiple Calendars," filed concurrently, which is incorporated herein by reference.

TECHNICAL FIELD

This application relates generally to calendar software and more particularly to calendar software that displays multiple calendar systems.

BACKGROUND OF THE INVENTION

Different cultures of the world may have their own calendar systems that have been developed throughout each culture's history and often based on each culture's religion. Common calendar systems used throughout the world today include the Gregorian Calendar (the common calendar system used in the United States and Europe), the Islamic (referred to as the Hijri) Calendar, the Jewish (or Hebrew Lunar) Calendar, the Chinese Calendar, and the Hindu (also referred to as the Saka Era) Calendar.

The various calendar systems of the world often differ from each other in significant details, such as the first day of the year, the number of days in a month, the number of days in a year, the number of months in a year, when the months start and end with respect to a year, and when the first year of the calendar system occurred. Often, these details were determined over the history of the culture using the calendar system and have both historical and religious significance.

One common feature, however, of the various calendar systems is the use of the 24-hour day as a basic element. This commonality allows a historical date in one calendar system to be converted to a date in another calendar system. For example, the Hijri calendar is based on the lunar year of 354 days. The number of days each month is adjusted according to the lunar cycle, beginning about two days after the new moon. Because the solar year is approximately 365 days long, the months drift backward over the seasons, beginning again on the same day every $32^1/2$ solar years. The Hijri Calendar year is counted from the year of the Hegira (anno Hegirae or A.H.)—the year in which Muhammad emigrated from Mecca to Medina (which in the Gregorian Calendar occurred in the year A.D. 622). Thus, the year A.D. 2004 in the Gregorian Calendar translates to the years A.H. 1424-1425 in the Hijri Calendar because of the different number of days in a year between the two calendar systems.

As another example, in the Chinese Calendar the lunar year is divided into 12 months of 29 or 30 days. The calendar is adjusted to the length of the solar year by the addition of extra months at regular intervals. The years are arranged in major cycles of 60 years. Each successive year is named after one of 12 animals. These 12-year cycles are continuously repeated. The Chinese New Year is celebrated at the second new moon after the winter solstice and falls between January 21 and February 19 on the Gregorian Calendar. The year A.D. 2004 in the Gregorian Calendar translates to the Chinese year 4701-4702.

Algorithms to convert past dates between calendar systems have been developed and are known in the art. See, e.g., J. E. Ahlquist, *Calendars and Software*, BULLETIN OF THE AMERICAN METEOROLOGICAL SOCIETY, vol. 81, p. 69-74 for a conversion of past dates between the Julian (old roman) Calendar and the modern Gregorian Calendar. Such conversions are relatively easy to develop because the past is fixed.

Conversion of future dates between calendar systems is more difficult because many calendar systems vary over time. In the Hijri Calendar, for example, the number of days in a future month are not known for certain because they vary based on the lunar cycle. While estimates may be made, future dates in many calendar systems often involve a certain amount of uncertainty (such as what day of the week on which they will fall, for example). This uncertainty also affects the ability to accurately convert future dates in one calendar system to another calendar system. Therefore, even though estimating algorithms for converting future dates are also known in the art (see, e.g., Derchowitz, et. al., *Calendrical calculations*, SOFTWARE—PRACTICE AND EXPERIENCE, vol. 20, no. 9, September 1990, p. 899-928 for conversion algorithms for the Gregorian, Jewish, Hijri, International Standard Organization, and Julian Calendars), the algorithms are only estimates because many calendar systems occasionally adjusted by human determinations of religious or physical events—such as did the moon rise before or after dawn as determined by a specific viewer at a given location.

In the modern world, a person involved with global business often must correlate between two or more calendar systems: a personal calendar system the person lives by (often determined based on the person's religion, culture, or place of origin), and a calendar system of the business relation with which the person does business. For example, a Muslim living in the United States may order his personal life using the Hijri Calendar, but may work and conduct business in the Gregorian Calendar used in United States. As another example, a Hindi based in Madras but working with British customers would be tracking dates in both the local Hindu Calendar and the Gregorian Calendar of the British customers.

Computer calendaring software and other computing devices with calendaring features are now available to assist users in tracking holidays, appointments, and other events. Typical computer calendaring software avoids the issue of converting dates between calendar systems by being limited to only one calendar system. A user who wishes to convert future dates into or from another calendar system must do so manually. The user also is responsible for identifying any calendar changes or adjustments (such as the addition of a day to a month) in one or the other calendar system that changes future date conversions in order to keep the conversion accurate. For example, a Gregorian Calendar user who wishes to record in calendaring software a future event (such as a meeting, deadline, or appointment) that recurs monthly on the Hijri Calendar needs to manually convert each occurrence of the event on the Hijri Calendar into a Gregorian Calendar date and input that Gregorian date into the Gregorian calendaring software as a single event. In addition to the manual conversion, the user also must manually update the dates of the occurrences on the Gregorian Calendar whenever an extra day is inserted into a Hijri month.

This is inefficient for a number of reasons. First, a recurring event in a first calendar system must be converted into and stored thereafter as some number of standalone events in the calendar system displayed by the calendaring software. Because multiple standalone, or "single" events require more data than one recurring event, this results in a much larger calendar data set for the displayed calendar. In addition, these single events must be continuously updated (manually by the user) over time to adjust to changes that may occur in either one of or both calendars calendar. The user must also manually change every single event if the underlying recurring event in the first calendar system changes.

Another problem is quickly correlating dates between two systems. For example, a calendar user may wish schedule an event on some date in the future, but not wish to schedule that event during one or more recurring dates in a secondary calendar. The current calendar software requires the user to either convert the secondary calendar recurring events into some number of single events and populate the calendar software with the single events manually (allowing the user to see the secondary calendar dates as single events on one display, which also allows the user to take advantage of the calendar software conflict detection features), or to manually attempt to visually correlate between the calendaring software calendar display and a hardcopy calendar display, date list, or some other source of secondary calendar information.

SUMMARY OF THE INVENTION

In accordance with the present invention, the above and other problems are solved by a calendar that can provide a calendar display showing a period of one or more days and simultaneously showing information for the days in the display period in more than one calendar system. The calendar system displays calendar data in calendar display based on a primary calendar system. The calendar system also calculates and displays information in a second calendar system so the user is simultaneously provided with information the primary and secondary calendar systems.

In accordance with still other aspects, the present invention relates to a method of displaying calendar data to a user. The method includes receiving a selection of a primary calendar system and a secondary calendar system from a set of calendar systems. In response to a command to display calendar data that falls within a display period, the method generates a calendar display that includes a graphical representation of the display period. A primary calendar system description of the display period and a secondary calendar system description of the display period are calculated. The primary and secondary calendar descriptions are then displayed along with the calendar data in the calendar display.

These and various other features as well as advantages, which characterize the present invention, will be apparent from a reading of the following detailed description and a review of the associated drawings.

DETAILED DESCRIPTION OF THE INVENTION

Various embodiments of the present invention will be described in detail with reference to the drawings. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Figure 1:
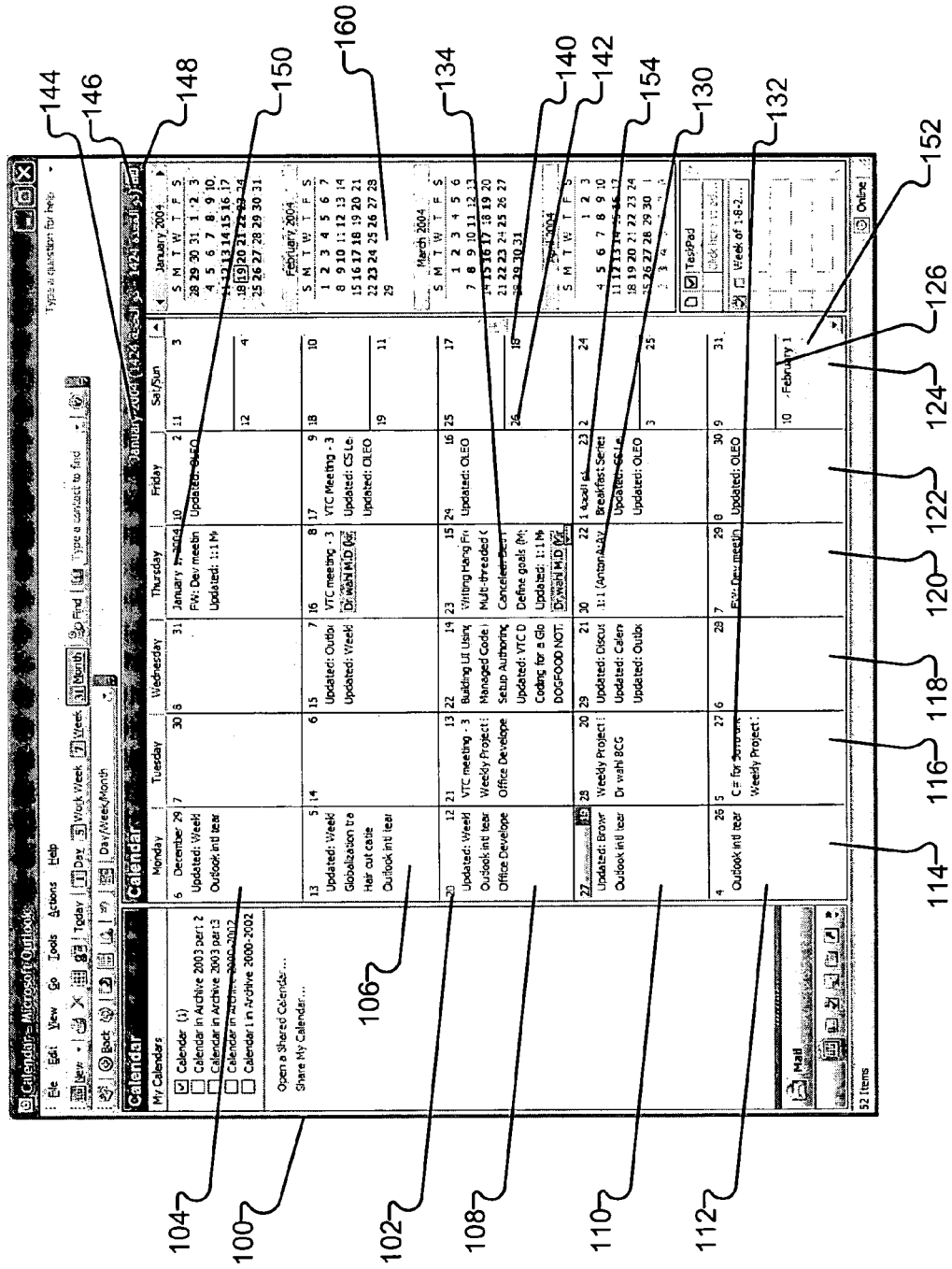
FIG. 1 presents an exemplary calendar display simultaneously presenting to the user calendar information in two calendar systems in accordance with one embodiment of the present invention.

FIG. 1 presents an exemplary calendar display simultaneously presenting to the user calendar information in two calendar systems in accordance with one embodiment of the present invention. The two calendar systems shown in the embodiment are the Gregorian Calendar (the primary calendar system) and the Hijri Calendar (the secondary calendar system). The calendar display 100 illustrated includes, among other items, a graphical representation 102 of a selected display period (i.e., the month of January, 2004) in a primary calendar system (the Gregorian Calendar system). One portion of the graphical representation 102 is divided into rows 104, 106, 108, 110, 112, one row for each week having days within the display period of the month of January 2004. Thus, in this embodiment, the actual display period of the graphical representation 102 is larger than the selected display period of January 2004. In addition, each row is subdivided into six columns 114, 116, 118, 120, 122, 124. One column is provided for each day of the week, (that is, a column 114 for Monday, a column 116 for Tuesday, a column 118 for Wednesday, a column 120 for Thursday, a column 122 for Friday) with the exception that only one column 124 is provided for Saturday and Sunday (which are shown in cells split by a horizontal line 126). In this way, graphical representation 102 has a cell corresponding to each day within the display period in the primary calendar system.

The calendar display 100 also shows multiple events, including events 130, 132, 134, on various days within the display period. The multiple events, including events 130, 132, 134 are signified in this graphical representation 102 as text within a cell corresponding to the date the event occurs. The events displayed may be single events or recurring events. The multiple events may, or may not depending on the implementation, indicate in the calendar display if they are single events or recurring events. Likewise, the events may or may not indicate if they are associated with a root calendar system that is different than the primary calendar system. In the embodiment shown, information such as whether an event is a recurring event and what root calendar system it is associated with (if any) is determined upon opening the event (such as by clicking on it by means of a mouse, for example) to see the details associated with it. Other methods of displaying events on a calendar display are possible and known in the art.

In the embodiment shown, although it cannot be determined from the graphical representation 102, the several events 130, 132, 134, are recurrences of recurring events that recur in periods of calendar systems other than the target calendar system. One event 130, for example, may be a recurrence of an event with a period every other month in the Hijri Calendar. A second event 132 may be a recurrence of an event recurring every month in the Chinese Calendar. A third calendar event 134 may be a recurrence of an event with a period of every month in the Chinese Calendar.

Each of these events 130, 132, 134, even though having different recurrence periods in different calendar systems, is displayed on the calendar display. The computer system may display periods in any calendar system as directed by the user and, through known conversions, automatically show single events and recurrences of each recurring event in the calendar data. The date shown for recurrences with different root calendar systems, especially those subject to change such as the Hijri Calendar, may not be absolutely correct, but will be based on the most current conversion known to the computing system and, therefore, be the best estimate known to the computing system of the date of the recurrences in the target calendar. As the conversion information is updated by the computer system (either automatically or under user direction) and the various dates approach, the accuracy of the estimated dates in the target calendar will improve.

The embodiment of the calendar display 100 shown displays primary calendar system period information 144 identifying the display period in the primary calendar system. In the embodiment shown, primary calendar system period information 144 is "January 2004" and is displayed in the upper right hand corner of a header bar 148 in the graphical representation 102. The calendar display 100 simultaneously displays secondary calendar period information 146 identifying the display period (i.e. the period starting on Dec. 29, 2003 and ending on Feb. 1, 2004) in the secondary calendar system (in the embodiment, the Hijri Calendar). The secondary calendar period information 146 is shown in parenthesis after the primary calendar system period information 144. The secondary calendar period information includes a year and month for the start date of the period (Dec. 29, 2003), a hyphen, and a year and month for the end date of the display period (Feb. 1, 2004).

In addition, calendar system period information is shown in other locations on the calendar display. For example, the cell 150 corresponding to the first of January includes the text "Jan. 1, 2004." Likewise, the cell 152 corresponding to the first of February is marked "February 1." In addition, the cell 154 for the 23$^{rd}$ of January corresponds to the first day of a new month in the secondary calendar system and contains the text for the name of the month in the secondary calendar system.

The embodiment of the calendar display 100 shown displays the primary calendar system date 140 for each day in the display period. The primary calendar system date 140 in the embodiment is the day of the month in the Gregorian system and is shown in the upper right hand corner of each cell in the graphical representation 102 corresponding to a day in the display period. Alternative embodiments may show the primary calendar dates in alternative locations with respect to their associated cell, such as for example, middle right, lower right, upper left, etc.

In addition, although it cannot be seen in the black and white representation shown in FIG. 1, the primary calendar dates and period information may be displayed with a common color, common font, or other common attributes that allows the user to easily identify the primary system dates. Likewise, the secondary calendar dates and period information may be displayed with a different common color, different common font, or other different common attributes that allows the user to easily identify the secondary system dates and information and distinguish them from the primary system. One example of a different common attribute, using a different language for words of secondary calendar system is shown in FIG. 1. In FIG. 1, the names of the months, when displayed, are displayed in the Arabic language, while the primary calendar system period information 144 in the English language.

The calendar display 100 described above may be used by calendar software, such as a scheduling, project management or daytimer application, implemented on a computing device such as that described generally in FIG. 2, below. Embodiments of the calendar display 100 may display more, or less information that that shown in FIG. 1. For example, FIG. 1 includes a sidebar display 160 of the month of the display period and the next three months in the primary calendar system, which is unrelated (in the embodiment shown) to the simultaneous display of information in two calendar systems. In another embodiment, the graphical representation 102 could include only the columns 114, 116, 118, 120, 122, 124 and rows 104, 106, 108, 110, 112 that define the cells associated with the days of the display period. In an alternative embodiment, two sidebars could be provided, one each calendar system, simultaneously showing a sidebar display periods in the two systems.

Figure 2:
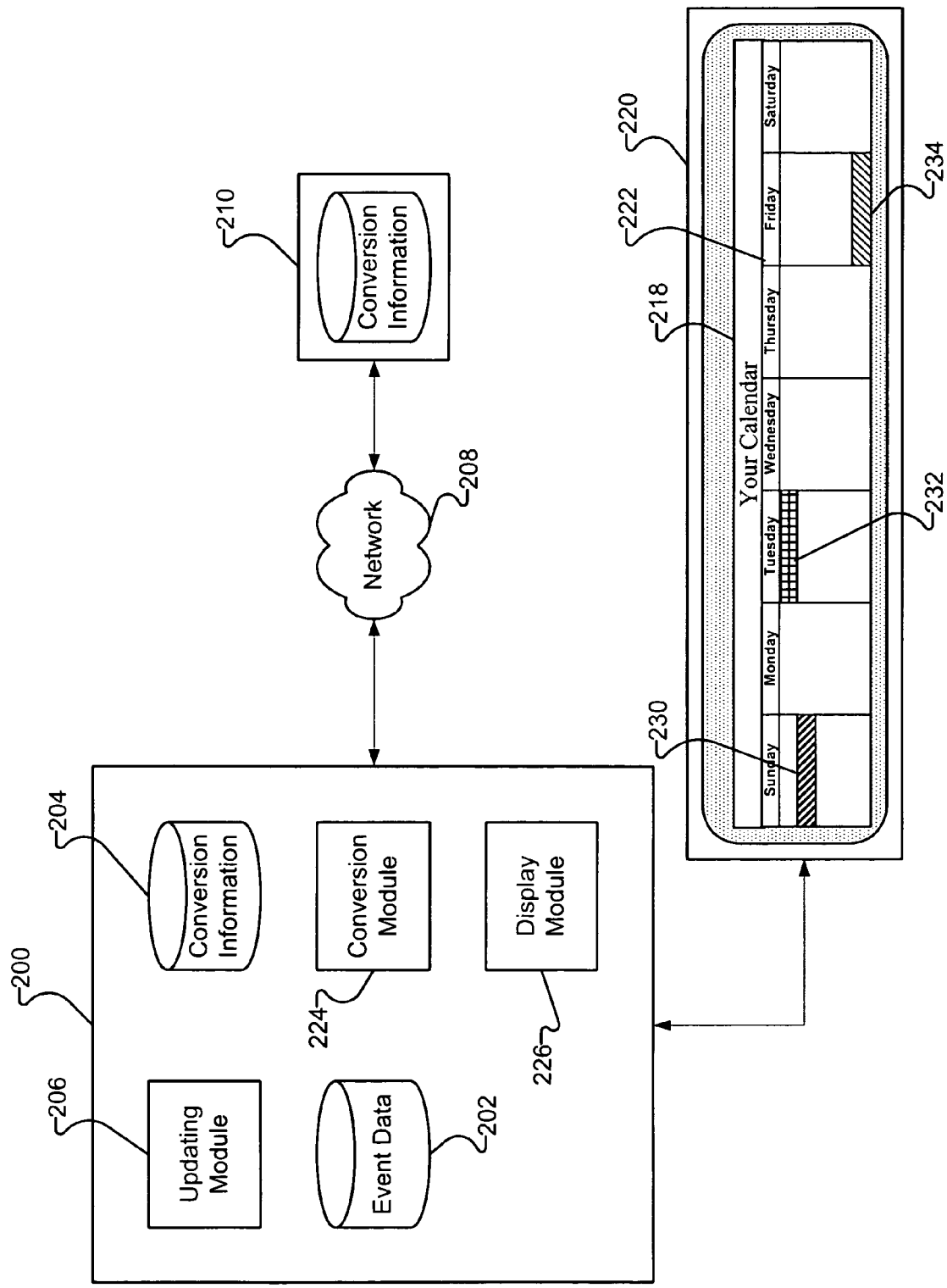
FIG. 2 illustrates an example of a suitable computing device environment on which embodiments of the invention may be implemented.

FIG. 2 is a functional block diagram of an embodiment of calendaring software implemented on a computing system in accordance with the present invention. The calendaring software 200 supports multiple calendar systems by storing event data for recurring events and future events, such as monthly and annual events, in a manner that identifies the root calendar system of the event. When displaying events, the calendaring software 200 converts the events, regardless of the recurring period or root calendar system, into dates on the displayed calendar system.

The calendaring software 200 includes a display module 226 that generates a calendar display 218 and outputs it to a monitoring device 220 such as a computer monitor, television or other display device. The calendar display 218 may include a graphical representation 222 of a display period, e.g. a month, a week, a day, etc., in a displayed calendar system. In the graphical representation 222 shown, a tabular representation of days in a single week display period is illustrated. Each day in the week is represented by a cells arranged in a row for the week and a header row is provided with the name of the day of the week above each cell. The calendaring software 200, in addition to generating the calendar display 218 for a display period, also populates the display 218 with any events 230, 232, 234 known to the calendaring software to occur within the display period.

In the embodiment shown in FIG. 2, events that are known to the calendaring software 200 are stored in a calendar data store 202. The calendar store 202 may store various data used by the calendaring software 200 to generate and populate calendar displays. Such information may include user preferences, graphical representations of different calendar systems, information specific to the supported calendar systems such as the names of the months, years, languages, etc., and event data related to user- or system-defined events.

Event data in the calendar data store 202 may describe one or more events in different root calendar systems. In one embodiment, an event data record is stored in the calendar data store for every event known to the calendaring software 200. According to aspects of the present invention, events can be described or characterized in multiple ways as single events or recurring events. Single events are events that are associated with only one date in a calendar system. Single events may be stored as generic dates, i.e., a certain number of days from some arbitrary date in history, e.g., January 1, A.D. 1600 in the Gregorian Calendar. Alternatively, single events may include a date in a calendar system and an identifier identifying the calendar system. Recurring events are events that recur periodically in a calendar system, that is events that have multiple occurrences (which may alternatively be referred to as recurrences of a first event) each associated with a different date. Holidays, birthdays, and appointments that recur every month or every year are all examples of recurring events. Event data for recurring events include a date, e.g., the date of the first occurrence in a generic form. Event data for recurring events also include data that identify the period of recurrence and data that identify the root calendar for the period, e.g., every month in the Hijri Calendar. The calendar data store 202, therefore, may store data for multiple single and recurring events, each based on a different root calendar systems.

Event data retrieved by the calendaring software 200 are converted by a conversion module 224 into an appropriate form prior to display. For example, if event dates are stored in a generic form, the conversion module 224 will convert the generic dates into the appropriate displayed calendar dates. In an alternative embodiment, some event data may be stored in a form that does not require conversion in order to populate the calendar display 218 with events. For example, dates may be stored in a form that does not require conversion.

To populate the calendar display 218 with recurring events, the event data for the recurring events, including the date, the period of recurrence and root calendar system data in addition to other data, are retrieved from the calendar data store 202. The conversion module 224 then creates a single event for each recurrence of the recurring event. A date in the root calendar system is calculated for each single event created. This is true even if the root calendar system is the same as the displayed calendar system being displayed in the calendar display 218. Next, the conversion module 224 converts the root calendar dates of the single events into generic dates. After the generic dates are determined, the conversion module 224 converts the generic dates into the dates of the displayed calendar system. The calendar display 218 is then populated with the resulting single events with displayed calendar dates and may be displayed using the display module 226

The conversion module 224 uses conversion information to perform the conversions described above. In the embodiment shown, the calendaring software 200 includes a conversion information store 204 that is separate from the calendar data store 202. In an alternative embodiment, the calendar data store 202 and the conversion information store 204 are combined into a single store. The conversion information store 204 includes conversion data, such as algorithms, for converting dates in one calendar system to dates in another calendar system. In one embodiment, the conversion information store 204 includes information sufficient to a) convert generic dates into dates in each calendar system supported by the software 200 and b) to convert dates in each supported calendar system into generic dates. In an alternative embodiment, the conversion information store 204 may include information sufficient to directly convert a date in any supported calendar system into a date in any other supported calendar system.

An updating module 206 may be provided, as shown in FIG. 2, to keep the conversion information in the conversion information store 204 current. This is particularly important if the calendaring software 200 supports one or more calendar systems, such as the Hijri Calendar, in which an additional day in a month may be inserted based on a human observation of the lunar cycle, that vary unpredictably over time. The updating module 206 is capable of accessing and retrieving updated conversion information via an internal network or an external network 208 such as the Internet. The updated conversion information may be located in a remote store 210 of conversion information, such as may be maintained on a religious or cultural website on a remote computing device 212. Alternatively, the developers of the calendaring software may maintain such a store 210 of updated conversion information as part of the support of the calendaring software 200. The updating module 206 may periodically check for updated conversion information or may check for such information each time a conversion is necessary.

The calendaring software 200 could be implemented on any suitable computing device environment. In one possible embodiment, a computing system may include a single computing device or multiple, connected computing devices. Computing devices are electronic devices that perform functions using a combination of hardware and/or software. Computing devices may include such hardware as a processor, computer readable storage media (including, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the system), and one or more communication devices suitable for transmitting and receiving data over communication media. In addition, computing devices may also include software, firmware or a combination of the two stored on the computer readable media. Examples of computing devices include personal computers, handheld computing devices such as personal data assistants, mobile communication devices, cellular telephones, networked appliances, computer servers, and mainframes and any other programmable device that can display calendar data.

Communication media includes any medium capable of carrying data or information such as computer-readable instructions, data structures, and program modules, whether such data is embodied in a modulated data signal such as a carrier wave or other transport mechanism. By way of example, and not limitation, communication media includes wired media such as a wired network or direct-wired connection, and wireless media such as acoustic, RF, infrared, and other wireless media.

Computing devices may be implemented using different software operating systems and programming languages. Examples of operating systems include Microsoft Windows XP, Macintosh OS X, OS2, Unix- and Linux-based operating systems, and Microsoft Windows CE. Examples of programming languages suitable for developing software embodiments include C, C++, Java, Visual Basic, Perl, and markup languages such as XML, HTML, and XAML. Selection of operating systems and software languages is often more an issue of user and developer preferences or convenience.

Figure 3:
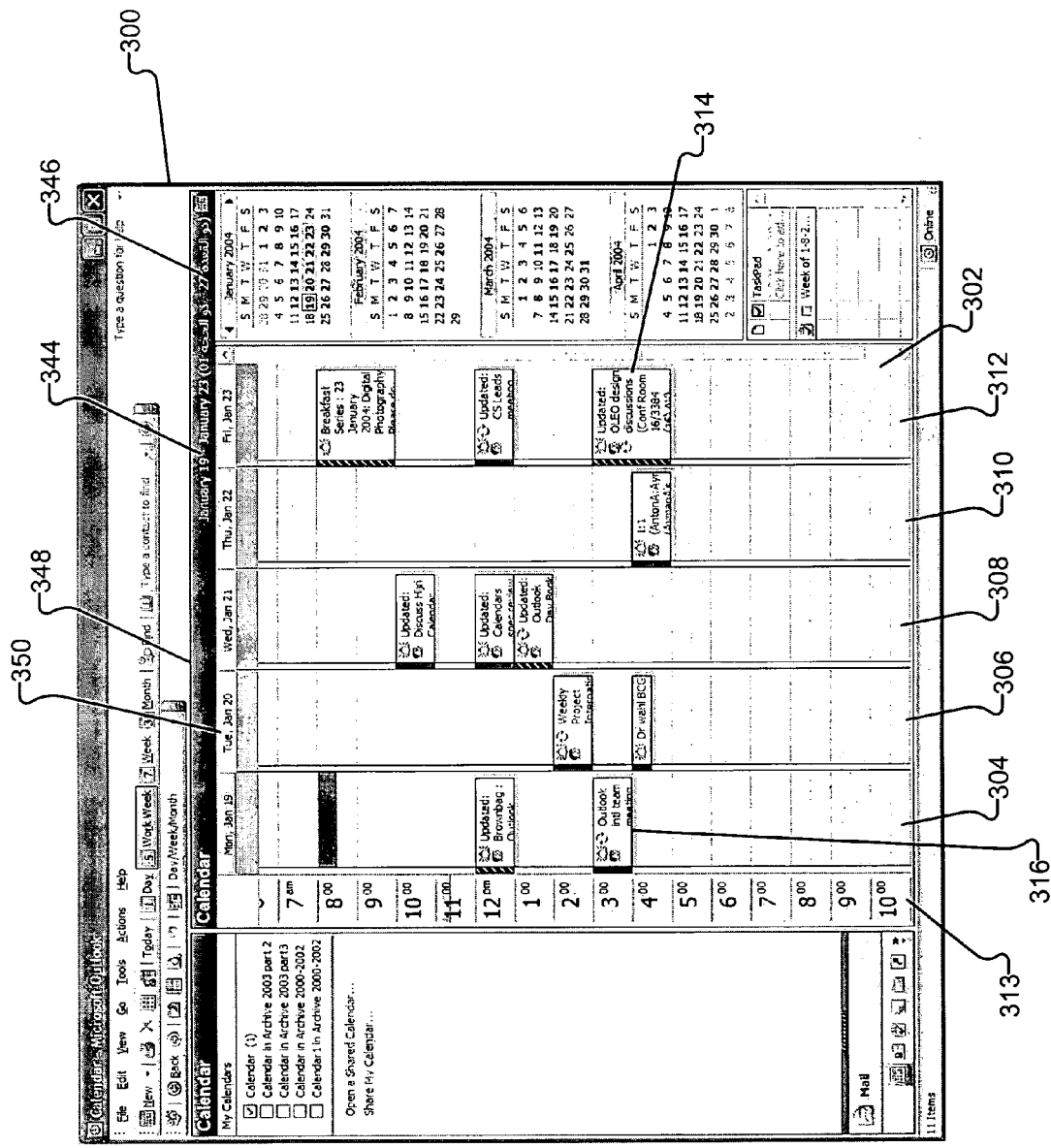
FIG. 3 shows another embodiment of calendar display that simultaneously displays information in a primary calendar system (the Gregorian Calendar) and a secondary calendar system (the Hijri Calendar).

FIG. 3 shows another embodiment of calendar display 300 that simultaneously displays information in a primary calendar system (the Gregorian Calendar) and a secondary calendar system (the Hijri Calendar). The calendar display 300 includes a graphical representation 302 of a display period of one work week (five days) in the primary calendar system. Each day is associated with a column 304, 306, 308, 310, 312 in this graphical representation 302. A time bar 313 is provided to the left of the columns 304, 306, 308, 310, 312 to allow a graphical display of what time period within each day events occur. Various events, such as events 314, 316, are shown as cells whose width is indicative of the duration of the event (and which correlate to the time bar 313). Many alternatives are possible for displaying events within a graphical representation of a day or a period of time within a day.

The embodiment of the calendar display 300 shown displays primary calendar system period information 344 identifying the display period in the primary calendar system. In the embodiment shown, primary calendar system period information 344 is "January 19- January 23" and is displayed in the upper right hand corner of a header bar 348 in the graphical representation 302. The calendar display 300 simultaneously displays secondary calendar period information 346 identifying the display period in the secondary calendar system (in the embodiment, the Hijri Calendar). The secondary calendar period information 346 is shown in parenthesis after the primary calendar system period information 344. The secondary calendar period information includes a date and month for the start date of the period (January 19), a hyphen, and a date and month for the end date of the display period (January 23).

In this embodiment, the secondary calendar period information 346 is the only secondary calendar information displayed. Many alternative embodiments are possible. For example, the calendar display as shown includes a column header bar 350 with the primary calendar system dates (in this case day of week, month, date). In an alternative embodiment, a second header bar (not shown) with the corresponding secondary calendar system dates is provided. In yet another alternative embodiment, corresponding secondary calendar system dates are provided in the column header bar 350 with the primary calendar system descriptions.

Again, as discussed with reference to FIG. 1, the primary calendar dates and period information may be displayed with a common color, common font, or other common attributes that allows the user to easily identify the primary system dates. Likewise, the secondary calendar dates and period information may be displayed with a different common color, different common font, or other different common attributes that allows the user to easily identify the secondary system dates and information and distinguish them from the primary system. As FIG. 1, the names of the months for the secondary calendar system period information 346 in the embodiment shown in FIG. 3 are displayed in a language related to the secondary calendar systems, i.e., Arabic.

Figure 4:
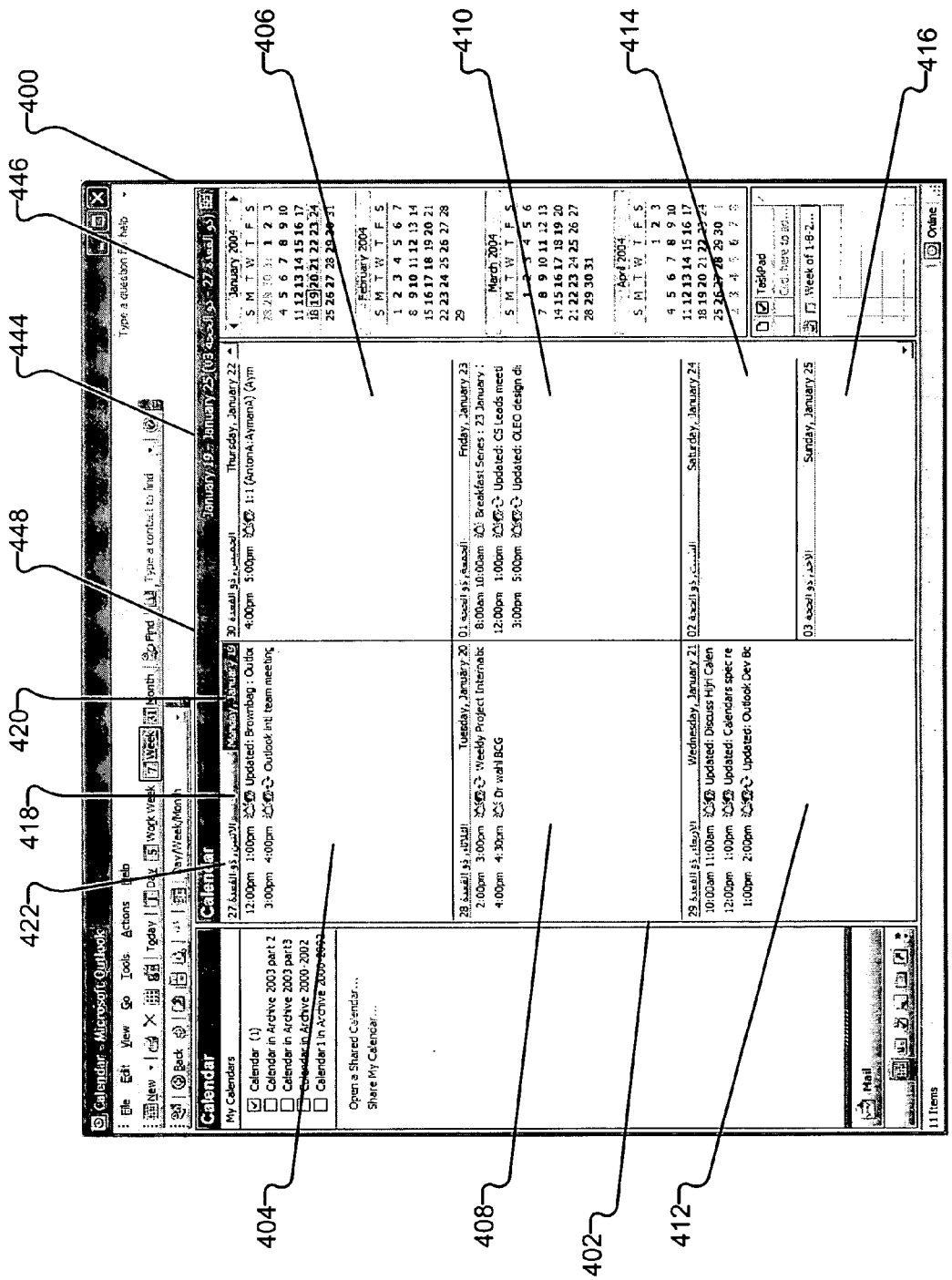
FIG. 4 presents yet another embodiment of a calendar display that simultaneously displays information related to the display period in a primary calendar system and a secondary calendar system.

FIG. 4 presents yet another embodiment of a calendar display 400 that simultaneously displays information related to the display period in a primary calendar system (the Gregorian Calendar) and a secondary calendar system (the Hijri Calendar). Again, the calendar display 400 includes a graphical representation 402 of the days within the display period (in this case a week of seven days). Each day is accorded a cell, that is a cell 404 for Monday, January 19, a cell 406 for Tuesday, January 20, a cell 408 for Wednesday, January 21, a cell 410 for Thursday, January 22, a cell 412 for Friday, January 23, and two smaller cells 414, 416 for Saturday and Sunday, respectively.

In FIG. 4, the calendar display 400 displays primary calendar system period information 444 identifying the display period in the primary calendar system. In the embodiment shown, primary calendar system period information 444 is "January 19- January 25" and is displayed in the upper right hand corner of a header bar 448 in the graphical representation 402. The calendar display 400 simultaneously displays secondary calendar period information 446 identifying the display period in the secondary calendar system (in the embodiment, the Hijri Calendar). The secondary calendar period information 446 is shown in parenthesis after the primary calendar system period information 444. The secondary calendar period information includes a date and month for the start date of the period, i.e., January 19, a hyphen, and a date and month for the end date of the display period, i.e., January 25, (remembering that the Arabic language is read from right to left so the order of the elements is adjusted accordingly).

In addition, each cell 404, 406, 408, 410, 412, 414, 416 in the calendar display 400 also includes a header bar, such as the header bar 418 in the cell 404 for Monday, that displays a primary calendar system date (in this embodiment the day of the week, month and date) 420 associated with the corresponding day in the right hand side of the header bar. Additionally, the calendar display 400 also includes in the header bar 418 a secondary calendar system date (in this embodiment the date, month, and day of the week) 422 associated with the corresponding day in the left hand side of the header bar 418.

Figure 5:
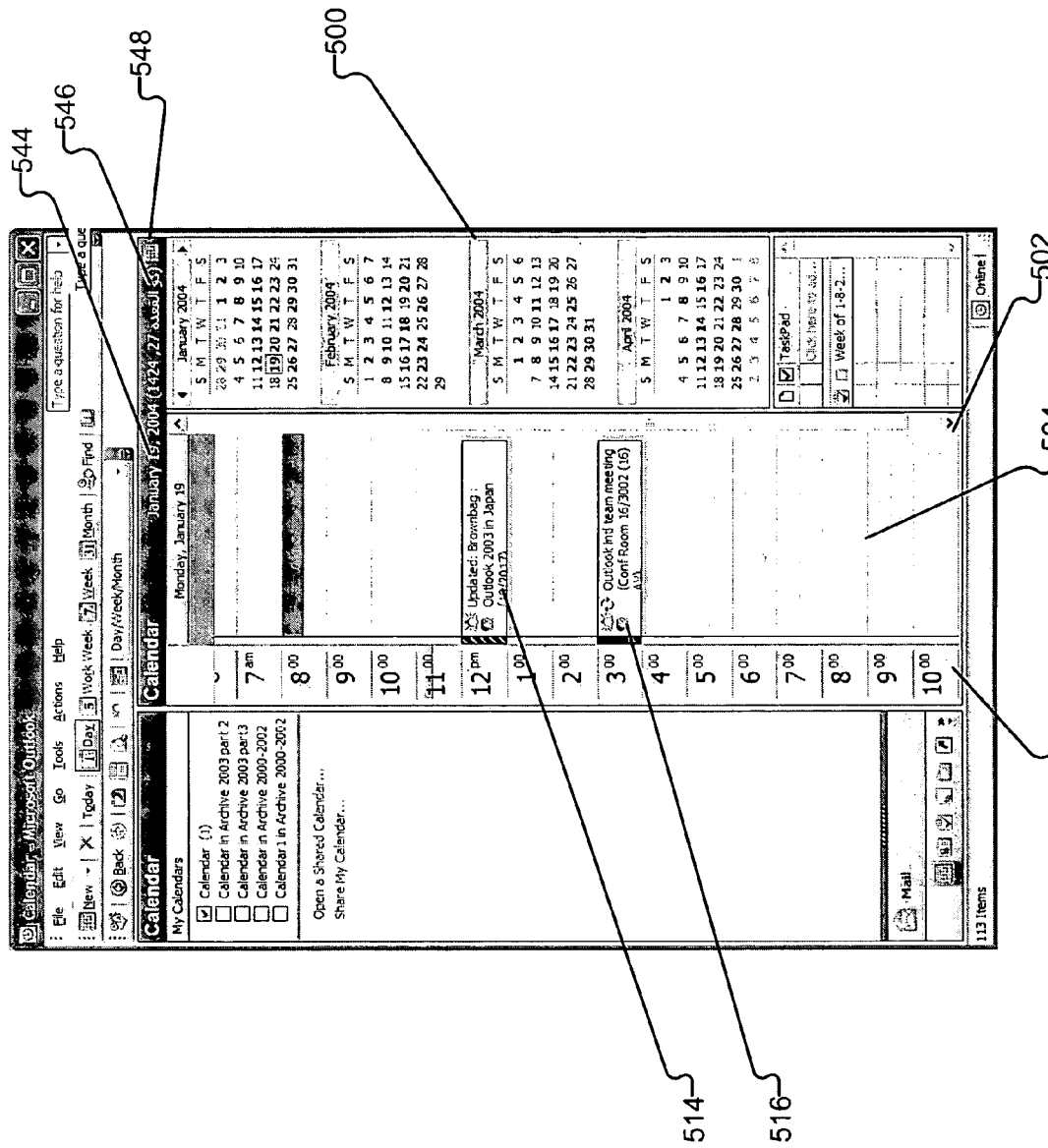
FIG. 5 presents yet another embodiment of a calendar display that simultaneously displays information in a primary calendar system and a secondary calendar system.

FIG. 5 presents yet another embodiment of a calendar display 500 that simultaneously displays information in a primary calendar system (the Gregorian Calendar) and a secondary calendar system (the Hijri Calendar). The calendar display 500 includes a graphical representation 502 of a display period of one day in the primary calendar system. The day is associated with a column 504 in this graphical representation 502. A time bar 513 is provided to the left of the column 504 to allow a graphical display of what time period within each day events occur. Various events, such as events 514, 516, are shown as cells whose width is indicative of the duration of the event (and which correlate to the time bar 513). Many alternatives are possible for displaying events within a graphical representation of a day or a period of time within a day.

The embodiment of the calendar display 500 shown displays primary calendar system period information 544 identifying the display period in the primary calendar system. In the embodiment shown, primary calendar system period information 544 is "Jan. 19, 2004" and is displayed in the upper right hand corner of a header bar 548 in the graphical representation 502. The calendar display 500 simultaneously displays secondary calendar period information 546 identifying the display period in the secondary calendar system (in the embodiment, the Hijri Calendar). The secondary calendar period information 546 is shown in parenthesis after the primary calendar system period information 544. The secondary calendar period information 544 includes a year, date and month for the day of the display period (January 19).

FIGS. 1, and 3-5 represent alternative embodiments of a calendar display that simultaneously displays to a user information related to the display period of the calendar display in two calendar systems. The embodiments of the calendar displays are provided as exemplary embodiments. One skilled in the art will recognize that alternatively more or less information in either system may be provided as desired. For example, calendar displays in accordance with the present invention could be adapted to display information related to three different calendar systems. In addition, other locations within the calendar display could be provided in which such information could be displayed to users.

The logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 6:
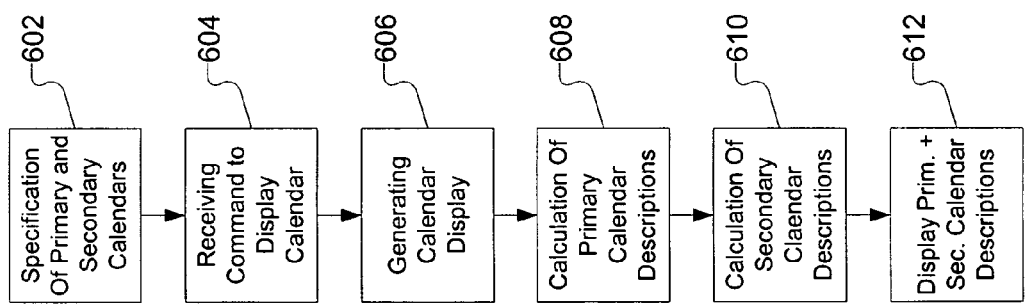
FIG. 6 illustrates the operational flow of one embodiment of a computing system displaying calendar data to a user, such as with the calendar displays discussed with reference to FIGS. 1 and 3-5.

FIG. 6 illustrates the operational flow of one embodiment of a computing system displaying calendar data to a user, such as with the calendar displays discussed with reference to FIGS. 1 and 3-5. In order to render a calendar display in accordance with one embodiment of the present invention, a primary calendar system and a secondary calendar system in which to provide information is specified. In FIG. 6, this may occur in a specification operation 602 in which the computing system receives a user selection of a primary calendar system and a secondary calendar system from a set of calendar systems. Alternatively, such specification may occur in whole or in part by default, or be determined by a manufacturer or system administrator without user intervention. For example, a computer system may require the Gregorian Calendar to be the primary calendar system, but allow a user to specify a secondary calendar from a list of supported calendar systems. In the specification operation 602, the user may be prompted to also identify preferences related to the display of calendar system information, such as what color, font, style, language, location, etc. to display each of the calendar system's information. Embodiments of this selection are discussed in greater detail with reference to FIG. 9, below.

Regardless of the nature of the specification operation 602, the computing system receives a command to display a display period in a receiving operation 604. This may occur as the result of a user instantiating a calendar application on the computing system or as the result of some other user action ultimately resulting in the display of calendar data. As mentioned, the command indicates some display period to display in the calendar display. The period may be designated in the command or may be a predetermined default period, for example a predetermined preferred display period set by the user or the computer system.

In response to the command, the computing system generates a calendar display in a display generating operation 606. The calendar display generated includes a graphical representation of the display period indicated in the receiving operation 604. The calendar display generated will have one or more locations throughout the display for primary calendar information and secondary calendar information. Some examples of locations were provided above with reference to FIGS. 1 and 3-5 and include header bars above columns and cells associated with days, months and weeks in the display period, locations within or in specific relation to cells in the calendar display associated with days or groups of days in the calendar display and hover displays that display calendar system information in response to the movement of a pointing device such as a mouse.

In order to provide the primary and secondary calendar system information, a calculation operation 608 calculates a primary calendar system description of the display period. This description may be calculated using a conversion known to the computing system for converting dates in one system, such as a generic date system, into dates in another system such as the Gregorian Calendar, as many calendars store calendar data in a generic system format. The calculation may determine simple primary calendar system period information and may also determine the detailed information for each day within the display period as necessary to provide the information elements needed by the calendar display generated in the generating operation 606.

The primary calendar system description of the display period may include a primary calendar system description for each day in the display period. Alternatively, it may include only a display period description, a combination of the two, or provide primary calendar descriptions for some subset of days in the calendar display based on some criteria, such as for the first day of every month.

A second calculation operation 610 also calculates a secondary calendar system description of the display period. This description may be calculated using a conversion known to the computing system for converting dates in one system, such as a generic date system, into dates in another system such as the Hijri Calendar, as many calendars store calendar data in a generic system format. The calculation may determine simple secondary calendar system period information. In addition, it may also determine the detailed information for each day within the display period as necessary to provide the information elements needed by the calendar display generated in the generating operation 606.

The secondary calendar system description of the display period may includes a secondary calendar system description for each day in the display period. Alternatively, it may include only a display period description, a combination of the two, or provide secondary calendar descriptions for some subset of days in the calendar display based on some criteria, such as for the first day of every secondary calendar month shown in the display period.

The first and second calculation operations 608, 610 may include accessing one or more stores of conversion information, such as conversion algorithms and data. In addition, as the specifics of calendar systems may change, the first and second calculation operations 608, 610 may automatically look for and update the conversion information. The first and second calculation operations 608, 610 may include calculating or identifying a generic date for each of the days in the display period.

Finally, a displaying operation 612 displays in the calendar display the primary calendar system description and the secondary calendar description. The displaying operation 612 may also include such steps as retrieving the appropriate colors, fonts, languages, etc. as specified in the specification operation 602. For example, the secondary calendar system may be associated with a second language that is different from the primary language associated with the calendar display. In this embodiment, the displaying operation 612 identifies the second language and displays any text in the secondary calendar description in the second language.

Many alternative embodiments of the operation flow in addition to that shown in FIG. 6 are possible. For example, the generating operation 604 may be performed after calculation operations 608, 610, rather than before as shown. The calculation operations 608, 610 may be combined into a single operation. A data store accessing operation (not shown) may be included to access calendar data such as data associated with calendar events. Embodiments may be altered in many ways to suit the application, computing device, or needs of the user with departing from the scope of the invention.

The operation flow of FIG. 6 may be repeated if the display period is changed. Depending on the implementation, the calculation operations 608, 610 may anticipate and support quick changing of the display period by calculating the primary and secondary calendar system descriptions for a predetermined period into the future and/or past in addition to the display period identified in the receiving operation 604.

Figure 7:
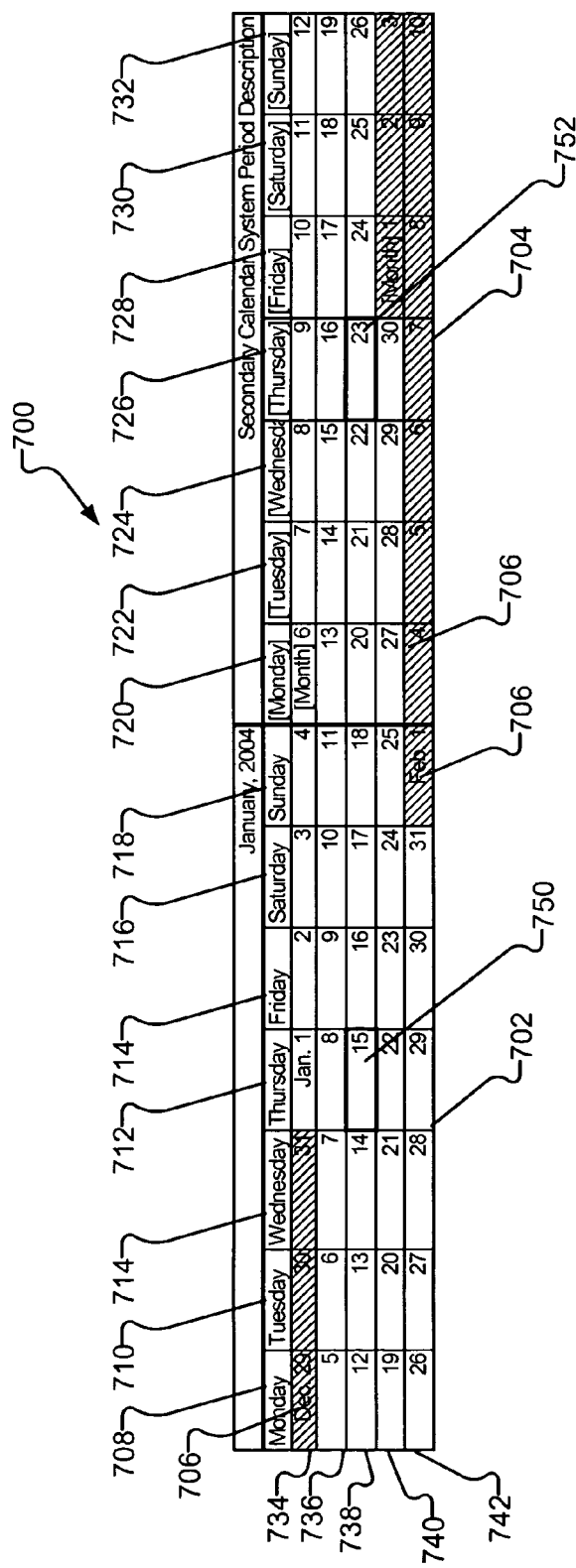
FIG. 7 presents yet another embodiment of a calendar display that simultaneously displays information in a primary calendar system and a secondary calendar system.

FIG. 7 presents yet another embodiment of a calendar display 700 that simultaneously displays information in a primary calendar system (the Gregorian Calendar) and a secondary calendar system (the dates correspond to the dates in the Hijri Calendar as shown in FIG. 1). In the embodiment shown in FIG. 7, the calendar display 700 includes a graphical representation 702 of the display period in the primary calendar system and a second graphical representation 704 of the display period in the secondary calendar system. The selected display period is, again, the month of January 2004 in the Gregorian Calendar, and again as in FIG. 1, the actual period displayed is greater than January 2004 because of the display having rows for each week having a day within the selected display period. In this embodiment the Gregorian Calendar is the primary calendar system and, therefore, the entire month of January is shown in the calendar display. Days 706 in the display period that are not part of the month of January are shown with a different pattern as a simple visual differentiator. Similar to the graphical representation discussed with reference to FIG. 1, a column 708-718 is provided for each weekday and rows 734-742 for each week so that each day is associated with a cell in the graphical representation 702.

Likewise, the second graphical display 704 is divided by columns 720-732 and rows 734-742 into cells associated with each day in the display period. In the second graphical representation 704, the different months in the Hijri Calendar are also differentiated visually by different patterns 706 to make the different months immediately obvious to a viewer. The patterns may be the same as that used in the graphical representation 702 of the primary calendar display period, or the patterns may be different. Some cells are provided with text identifying the month in the secondary calendar system as denoted by [Month]. A header with the days of the week displayed in an alternative language may also be provided as shown by the text "[Monday]", "[Tuesday]", "[Wednesday]", "[Thursday]", "[Friday]", "[Saturday]" and "[Sunday]".

The simultaneous display of two calendars allows the user an easy and quick visual correspondence between days in the two systems. For example, the user could quickly scroll through different months looking for dates the meet various criteria, rather than trying different dates manually. In the screenshot of FIG. 7, the cell 750 associated with Jan. 15, 2004 is highlighted. The corresponding cell 752 in the second graphical representation 704 is also highlighted, providing an easy visual correlation for the user. In an embodiment, a selection of a day or group of days on one graphical representation 702 or 704 results in the highlighting of the days on both graphical representations 702, 704.

Figure 8:
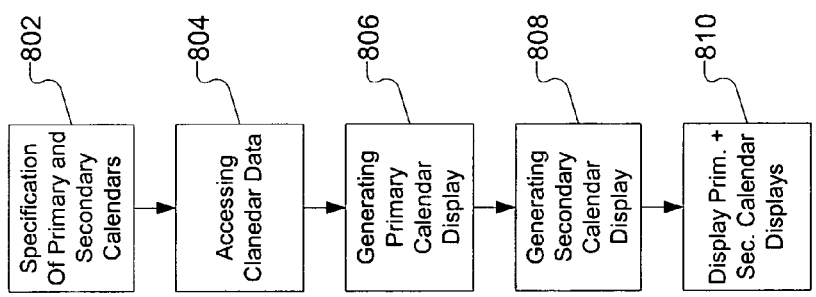
FIG. 8 illustrates the operational flow of one embodiment of a computing system displaying calendar data to a user, such as with the calendar displays discussed with reference to FIG. 7.

FIG. 8 illustrates the operational flow of one embodiment of a computing system displaying calendar data to a user, such as with the calendar displays discussed with reference to FIG. 7. In order to render a calendar display, a primary calendar system and a secondary calendar system in which to provide information is specified. In FIG. 8, this may occur in a specification operation 802 in which the computing system receives a user selection of a primary calendar system and a secondary calendar system from a set of calendar systems. Alternatively, such specification may occur in whole or in part by default, or be determined by a manufacturer or system administrator without user intervention. For example, a computer system may require the Gregorian Calendar to be the primary calendar system, but allow a user to specify a secondary calendar from a list of supported calendar systems. In the specification operation 802, the user may be prompted to also identify preferences related to the display of calendar system information, such as what color, font, style, language, location, etc. to display each of the calendar system's information.

Next, an accessing operation 804 accesses calendar data, which may include, for example, the calendar data for events associated with days within the display period. The data may include descriptive information as date, time, recurrence period, and other information related to the event.

A first generation operation 806 generates a first calendar display. The first calendar display includes a graphical representation of at least the days within the display period in the primary calendar system. The generation operation 806 may also populate the first calendar display with the events and data obtained from the accessing operation 804 that are associated with days in the display period.

A second generation operation 808 then generates a second calendar display. The second calendar display includes a graphical representation of the days displayed by the first calendar display in the secondary calendar system and, for each event associated with a date within the display period, indicating the occurrence of an event.

Lastly, a displaying operation 810 displays both the first calendar display and the second calendar display to the user simultaneously. This may be a side-by-side display as shown in FIG. 7, or a one above/one below display. Other embodiments are also possible.

Alternative embodiments of the operational flow of FIG. 8 are also possible, depending on the implementation of the calendar display. For example, the primary calendar display and the secondary calendar display may each be graphical representations in a combined calendar display. In this embodiment, the first and second generation operations 806, 808 may be combined into a single generation operation.

Figure 9:
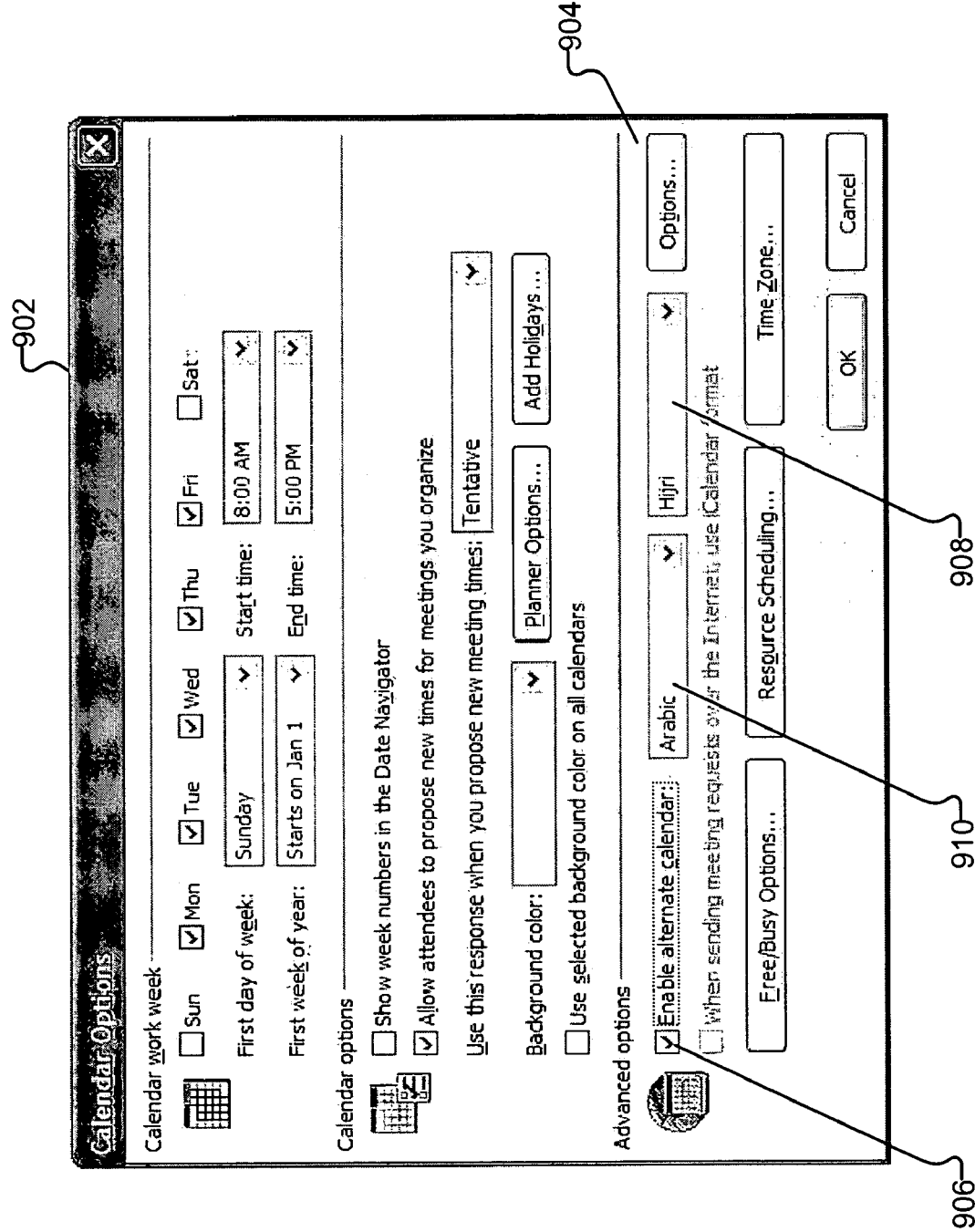
FIG. 9 illustrates one embodiment of a menu provided to users for selecting a primary calendar system and a secondary calendar system for use in subsequent calendar displaying operations.

FIG. 9 illustrates one embodiment of a control panel interface provided to users for selecting a primary calendar system and a secondary calendar system for use in subsequent calendar displaying operations. The control panel interface 902 is exemplary of an interface that may be used by an application on a computing device to allow a user to control various calendar display options.

The control panel interface 902 includes a section 904 titled "Advanced Options". The Advanced Options section 904 allows the user to specify if information related to a secondary calendar system is to be displayed when the software application displays calendar data by checking the "enable alternate calendar" box 906 or using the hot key equivalent as shown. In the embodiment a drop down box 908 is provided to allow selection of the secondary calendar system. A second drop down box 910 is provided to allow the user to independently select the language to display the secondary calendar system information in. In the embodiment shown, the Gregorian Calendar is predetermined as the primary calendar system. This may be the result of a user selection on a different control panel or may have been dictated by the administrator or software developer.

Thus, the present invention is presently embodied as a method, apparatus, computer program product or computer readable media encoding a computer program for simultaneously presenting to a viewer calendar information in two or more different calendar systems as part of a single calendar display or a set of calendar displays.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. A computer implemented method of displaying calendar data to a user comprising:
   receiving a user selection of a primary calendar system and a secondary calendar system, wherein the primary calendar system comprises one of, and the secondary calendar system comprises a different one of, the following calendar systems: Gregorian, Hijri, Jewish, Chinese, Saka Era, International Standard Organization, or Julian;
   accessing calendar data, the calendar data including a plurality of events, wherein each of the plurality of events has a description and wherein each of the plurality of events are associated with at least one respective date in the primary calendar system;
   converting each of the at least one respective date for each of the plurality of events to the secondary calendar system;
   generating a first calendar display, the first calendar display being a graphical representation of dates of two or more consecutive days in the primary calendar system within a display period, and indicating the occurrence of the plurality of events in the first calendar display;
   generating a second calendar display, the second calendar display being a graphical representation in the secondary calendar system of at least the dates within the display period and indicating the occurrence of the plurality of events in the second calendar display;
   simultaneously displaying the first calendar display and the second calendar display to the user;
   receiving a user selection of a date on the first calendar display of the second calendar display; and
   highlighting the user selected date on both the first calendar display and the second calendar display in response to the user selection of the date.

2. The method of claim 1, wherein the first calendar display and the second calendar display are presented side by side.

3. The method of claim 1 further comprising:
   receiving a user command to create a recurring event in the secondary calendar system, the recurring event being a series of recurrences separated by a secondary calendar system period, each recurrence associated with a date;
   indicating, for each recurrence associated with a date within the display period, the occurrence of the recurring event in the second calendar display and in the first calendar display.

4. The method of claim 3 further comprising:
   converting each recurrence of the recurring event in the secondary calendar system into a corresponding non-recurring event in the primary calendar system.

5. The method of claim 3 further comprising:
   associating, with each recurrence displayed in the first calendar display, information indicating that the recurrence is part of a recurring event in the secondary calendar system.

6. The method of claim 1 further comprising:
   receiving a user-selection of a two calendar display mode.

7. The method of claim 3 further comprising:
   receiving a command to delete the recurring event;
   removing, for each recurrence associated with a date within the display period, the indication of occurrence of the recurring event in the second calendar display and in the first calendar display.

8. The method of claim 1 further comprising:
   receiving a user command to change at least one date associated with one of the plurality of events displayed on the first calendar display to a new date in the primary calendar system; and
   changing the first calendar display to display the event on the new date;
   changing the second display to display the event on a date in the secondary calendar system that corresponds to the new date in the primary calendar system.

9. A computer implemented method of displaying a first set of calendar data to a user comprising:
   receiving a user selection of a primary language from a plurality of language selections;
   receiving a user selection of a primary calendar system from a set of calendar systems;
   receiving a user selection of a secondary language from the plurality of language selections;
   receiving a user selection of a secondary calendar system from the set of calendar systems, wherein the primary calendar system comprises one of, and the secondary calendar system comprises a different one of, the following calendar systems: Gregorian, Hijri, Jewish, Chinese, Saka Era, International Standard Organization, or Julian;
   receiving a user command to display calendar data in a first display period based on the primary calendar system, wherein the first display period comprises a plurality of days;
   generating a calendar display, the calendar display including a graphical representation of a second display period, the second display period including at least the first display period;
   calculating a primary calendar system description of the first display period;
   calculating a secondary calendar system description of the second display period;
   displaying in the calendar display the first set of calendar data, the primary calendar system description in the primary language, and the secondary calendar system description in the secondary language; and receiving a user command to create a recurring event in the secondary calendar system, the recurring event being a series of recurrences separated by a secondary calendar system period, each recurrence associated with a date and each event comprising at least one of an appointment, holiday, meeting or deadline;

indicating, for each recurrence associated with a date within the second display period, the occurrence of the recurring event in the calendar display in both of the primary calendar system and the secondary calendar system.

10. The method of claim 9, wherein the primary calendar system description of the first display period includes a primary calendar system description for each day in the second display period, and wherein the secondary calendar system description of the display period includes a secondary calendar system description for each day in the second display period.

11. The method of claim 9, wherein the secondary language is different than the primary language.

12. The method of claim 10, wherein the second display period is a period of time within each of a work week of five days and further comprising:
generating a calendar display, the calendar display including a graphical representation of each of the five days in the work week; and
displaying in a header above the graphical representations the primary calendar system description and the secondary calendar description.

13. The method of claim 10, wherein the second display period is a period of time within each of a work week of five days and further comprising:
generating a calendar display, the calendar display including a graphical representation for each of the five days in the work week; and
displaying in each graphical representation the primary calendar system description and the secondary calendar description of the day associated with the graphical representation.

14. The method of claim 10, wherein the second display period is a period of time within a week of seven days and further comprising:
generating a calendar display, the calendar display including a graphical representation of each of the days in the week; and
displaying in a header above the graphical representations the primary calendar system description and the secondary calendar description.

15. The method of claim 10, wherein the second display period is a week of seven days and further comprising:
generating a calendar display, the calendar display including a graphical representation for each of the days in the week; and
displaying in each graphical representation a primary calendar system description and a secondary calendar description of the day associated with the graphical representation.

16. The method of claim 10, wherein the second display period is a period of time within a day and further comprising:
generating a calendar display, the calendar display including a graphical representation of the day; and
displaying in a header above the graphical representation the primary calendar system description and the secondary calendar description.

17. The method of claim 10, wherein the second display period is a period of time within a day and further comprising:
generating a calendar display, the calendar display including a graphical representation of the day; and
displaying in the graphical representation the primary calendar system description and the secondary calendar description of the day.

18. The method of claim 10, wherein the first display period is a month in the primary calendar system and the calendar display includes a graphical representation of each of the days in the month; and wherein displaying further comprises:
displaying in a header above the graphical representation a primary calendar system description of the month and the secondary calendar description of the second display period.

19. The method of claim 10, wherein the first display period is a month in the primary calendar system and the calendar display includes a graphical representation of each of the days in the month; and wherein displaying further comprises:
displaying in each graphical representation the primary and secondary calendar system descriptions of the day associated with the graphical representation.

20. The method of claim 10, wherein the first display period is a month in the primary calendar system and the calendar display includes a graphical representation of each of the days in the month; and wherein displaying further comprises:
displaying in a header above the graphical representation a primary calendar system description of the month and the secondary calendar description of the second display period; and
displaying in each graphical representation the primary and secondary calendar system descriptions of the day associated with the graphical representation.

21. The method of claim 9, wherein the primary calendar system description and the secondary calendar description are displayed in a header above the graphical representation.

22. The method of claim 9, wherein the second display period includes a plurality of days and further comprising:
generating a calendar display, the calendar display including a graphical representation of each day in the second display period;
calculating a primary calendar system description for each day in the second display period;
calculating a secondary calendar system description for each day in the second display period; and
displaying in each graphical representation the primary calendar system description and the secondary calendar description for the day associated with the graphical representation.

23. The method of claim 9, wherein the primary calendar system description identifies at least a month and year in the primary calendar system and the secondary calendar system description identifies at least a month and year in the secondary calendar system.

24. The method of claim 23, wherein the primary calendar system description identifies at least a date, month and year in the primary calendar system and the secondary calendar system description identifies at least a date, month and year in the secondary calendar system.

25. The method of claim 10 further comprising:
identifying a generic date for each day in the second display period;

accessing conversion information for converting a generic date into a primary calendar system description of the generic date; and accessing conversion information for converting a generic date into a secondary calendar system description of the generic date.

26. A method of displaying a calendar comprising:

specifying a primary calendar system and a first language associated with the primary calendar system;

receiving a user selection to display a secondary calendar system;

receiving a user selection of a second language to be associated with the secondary calendar system;

receiving a user selection of the secondary calendar system, wherein the primary calendar system comprises one of, and the secondary calendar system comprises a different one of, the following calendar systems: Gregorian, Hijri, Jewish, Chinese, Saka Era, International Standard Organization, or Julian; and displaying a calendar display with a graphical representation of a plurality of days within a display period, the calendar display comprising a cell or column representing each day, each cell or column containing a representation of a corresponding date in the primary calendar system and a corresponding date in the secondary calendar system;

wherein the calendar display includes text in the first language identifying the display period in the primary calendar system and text in the second language identifying the display period in the secondary calendar system;

wherein the graphical representation is a cell in the calendar display for each day in the display period and wherein each cell includes text in the first language identifying the display period in the primary calendar system and text in the second language identifying the display period in the secondary calendar system;

receiving a user command to create a recurring event in the secondary calendar system, the recurring event being a series of recurrences separated by a secondary calendar system period, each recurrence associated with a date and each event comprising at least one of an appointment, holiday, meeting or deadline; and indicating, for each recurrence associated with a date within the second display period, the occurrence of the recurring event in the calendar display in both of the primary calendar system and the secondary calendar system.

27. The method of claim 26 wherein specifying comprises:

receiving a user selection of the primary calendar system; and receiving a user selection of the first language.

28. The method of claim 26, wherein the first language and the second language are different.

29. The method of claim 26, wherein the primary calendar system is the Gregorian Calendar and the secondary calendar system is selected from a set of calendar systems including the Hijri Calendar, the Chinese Calendar, the Saka Era Calendar, and the Jewish Calendar.

30. The method of claim 26, wherein the primary calendar system and the secondary calendar system have a different number of days in a year.

31. The method of claim 26, wherein the primary calendar system and the secondary calendar system have a different number of days in a month.

32. The method of claim 26, wherein receiving the selection of the secondary language occurs before receiving the selection of the calendar system.

33. The method of claim 26, wherein each cell or column includes a header bar with text in the first language describing a day of the week in the first calendar system, and text in the second language describing a day of the week in the secondary calendar system.

* * * * *

UNITED STATES PATENT AND TRADEMARK OFFICE
CERTIFICATE OF CORRECTION

| | | |
|---|---|---|
| PATENT NO. | : 7,349,920 B1 | Page 1 of 1 |
| APPLICATION NO. | : 10/778273 | |
| DATED | : March 25, 2008 | |
| INVENTOR(S) | : Yaniv Feinberg et al. | |

It is certified that error appears in the above-identified patent and that said Letters Patent is hereby corrected as shown below:

In column 15, line 61, in Claim 1, delete "of" and insert --or--, therefor.

Signed and Sealed this
Twenty-second Day of February, 2011

David J. Kappos
*Director of the United States Patent and Trademark Office*